US011634188B2

(12) United States Patent
North et al.

(10) Patent No.: US 11,634,188 B2
(45) Date of Patent: Apr. 25, 2023

(54) COLLECTING ELECTRIC SCOOTERS

(71) Applicant: Neptune Scooters, San Carlos, CA (US)

(72) Inventors: Forrest Jean North, San Carlos, CA (US); Matthew Michael O'Brien, San Carlos, CA (US)

(73) Assignee: Neptune Scooters, San Carlos, CA (US)

( * ) Notice: Subject to any disclaimer, the term of this patent is extended or adjusted under 35 U.S.C. 154(b) by 155 days.

(21) Appl. No.: 17/211,655

(22) Filed: Mar. 24, 2021

(65) Prior Publication Data

US 2021/0300503 A1 Sep. 30, 2021

Related U.S. Application Data

(60) Provisional application No. 62/993,912, filed on Mar. 24, 2020.

(51) Int. Cl.
*B62K 19/30* (2006.01)
*B62K 27/12* (2006.01)
(Continued)

(52) U.S. Cl.
CPC ............. *B62H 3/08* (2013.01); *B62J 6/057* (2020.02); *B62K 3/002* (2013.01); *B62K 11/00* (2013.01); *B62K 11/02* (2013.01); *B62K 11/14* (2013.01); *B62K 19/30* (2013.01); *B62K 27/12* (2013.01); *B62M 6/45* (2013.01); *B62M 6/90* (2013.01); *B62H 2003/005* (2013.01); *B62H 2700/005* (2013.01); *B62K 2202/00* (2013.01)

(58) Field of Classification Search
CPC .... B62K 19/30; B62K 27/12; B62K 2202/00; B62M 6/45; B62M 6/90
See application file for complete search history.

(56) References Cited

U.S. PATENT DOCUMENTS 9,440,698 B2 * 9/2016 Dadoosh ................. B60L 53/14
9,944,338 B2 * 4/2018 Behar .................... B62K 19/30
(Continued)

FOREIGN PATENT DOCUMENTS

CN 108988089 A * 12/2018
CN 108988089 A 12/2018

OTHER PUBLICATIONS

International Search Report and Written Opinion dated Jul. 9, 2021 for International Patent Application No. PCT/US2021/023986.

*Primary Examiner* — Minnah L Seoh
*Assistant Examiner* — Ryan Edward Hardy
(74) *Attorney, Agent, or Firm* — AMPACC Law Group, PLLC

(57) ABSTRACT

Systems and methods for collecting electric scooters are described herein. In some embodiments, the systems and methods facilitate a "snaking" configuration of attaching, coupling, or fixing multiple electric scooters to one another. The snaking configuration enables multiple electric scooters to be collected together and moved to various locations, such as locations where the electric scooters can be rented, serviced, and so on. Further, the systems and methods enable any electric scooter to act as a collecting scooter, and thus a scooter share service or other fleet of scooters can manage the collection and provisioning of scooters in a location without special vehicles or equipment, among other benefits.

19 Claims, 18 Drawing Sheets

(51) Int. Cl.
  *B62M 6/45*    (2010.01)
  *B62M 6/90*    (2010.01)
  *B62H 3/08*    (2006.01)
  *B62K 11/00*   (2006.01)
  *B62J 6/057*   (2020.01)
  *B62K 3/00*    (2006.01)
  *B62K 11/02*   (2006.01)
  *B62K 11/14*   (2006.01)
  *B62H 3/00*    (2006.01)

(56) References Cited

U.S. PATENT DOCUMENTS

2006/0249925 A1* 11/2006 Yan ................. B62K 3/002
                                              280/252
2016/0318578 A1* 11/2016 Heber ................ B62M 6/50
2019/0209913 A1   7/2019 Koch et al.
2019/0287324 A1*  9/2019 Wu ................. G06Q 30/0253
2020/0086939 A1*  3/2020 Iseman ............... B62K 3/002
2021/0158460 A1*  5/2021 Fang ................. H04W 4/023

* cited by examiner

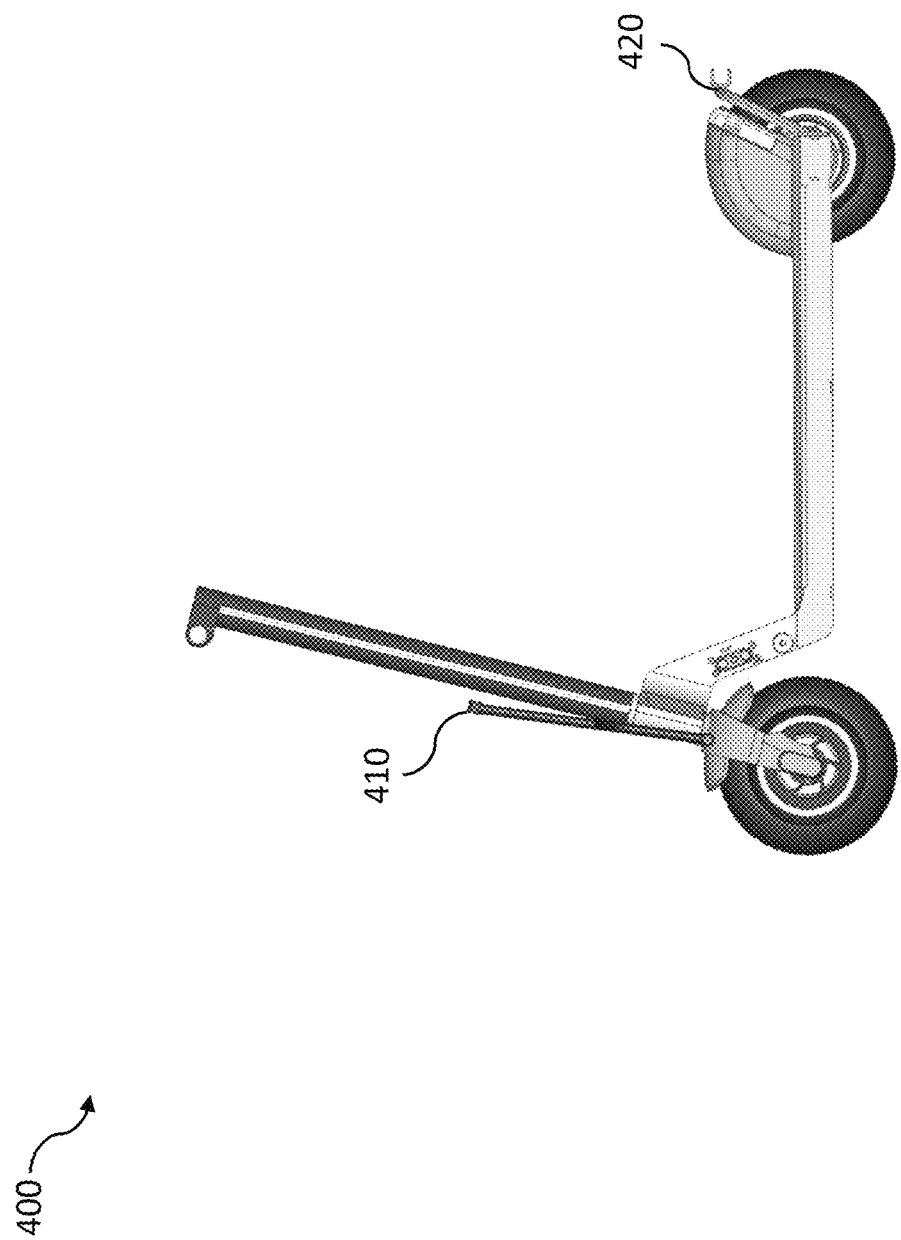

COLLECTING ELECTRIC SCOOTERS

CROSS REFERENCE TO RELATED APPLICATIONS

This application claims priority to U.S. Provisional Patent Application No. 62/993,912, filed on Mar. 24, 2020, entitled ELECTRIC SCOOTERS AND ASSOCIATED SYSTEMS, which is incorporated by reference in their entirety.

BACKGROUND

There are many ways to get around a city. A person can walk, drive, travel by bus, tram, subway, taxi, or hire a car share service. A person can also rent or use various individual modes of transportation, such as mopeds, bikes (e.g., e-bikes or ebikes), scooters, skateboards (electric skateboards) and/or other micro-mobility vehicles or devices. For example, many cities provide residents and visitors with bike share and scooter share services, such as services that enable people to rent bikes or electric scooters when traveling short distances within a city.

While these services provide people with numerous benefits, current installations and provisioning of bike and scooter shares suffer from various drawbacks. For example, services that provide the docking of bikes or scooters can take up a large footprint within a city or neighborhood, such as in areas where any extra space can be utilized for parking, footpaths, and so on. As another example, services that provide dock-less bikes and scooters enable users to simply leave their rented bikes and scooters in the middle of sidewalks, in yards, and other undesirable locations. Further, left-behind bikes and scooters can be damaged or stolen.

There are various possible drawbacks associated with providing a community with hundreds or thousands of electric scooters for use in share services. Some of these drawbacks are due to users finishing their rides on the scooters and simply leaving the scooter on a sidewalk or street or park (even with docking stations available to return the scooters). Thus, after a certain time period of use, a location or community may have many scooters scattered across an area. Typically, share services can work to collect the scooters and return them to stations or other designated pickup or drop-off locations. However, such collection may rely on trucks or other large vehicles to collect the scooters in an inefficient manner.

These and other drawbacks exist with respect to electric scooters and electric scooter share services.

BRIEF DESCRIPTION OF THE DRAWINGS

FIGS. 4A-4C are diagrams illustrating an electric scooter having vertical attachment components.

Figure 1:
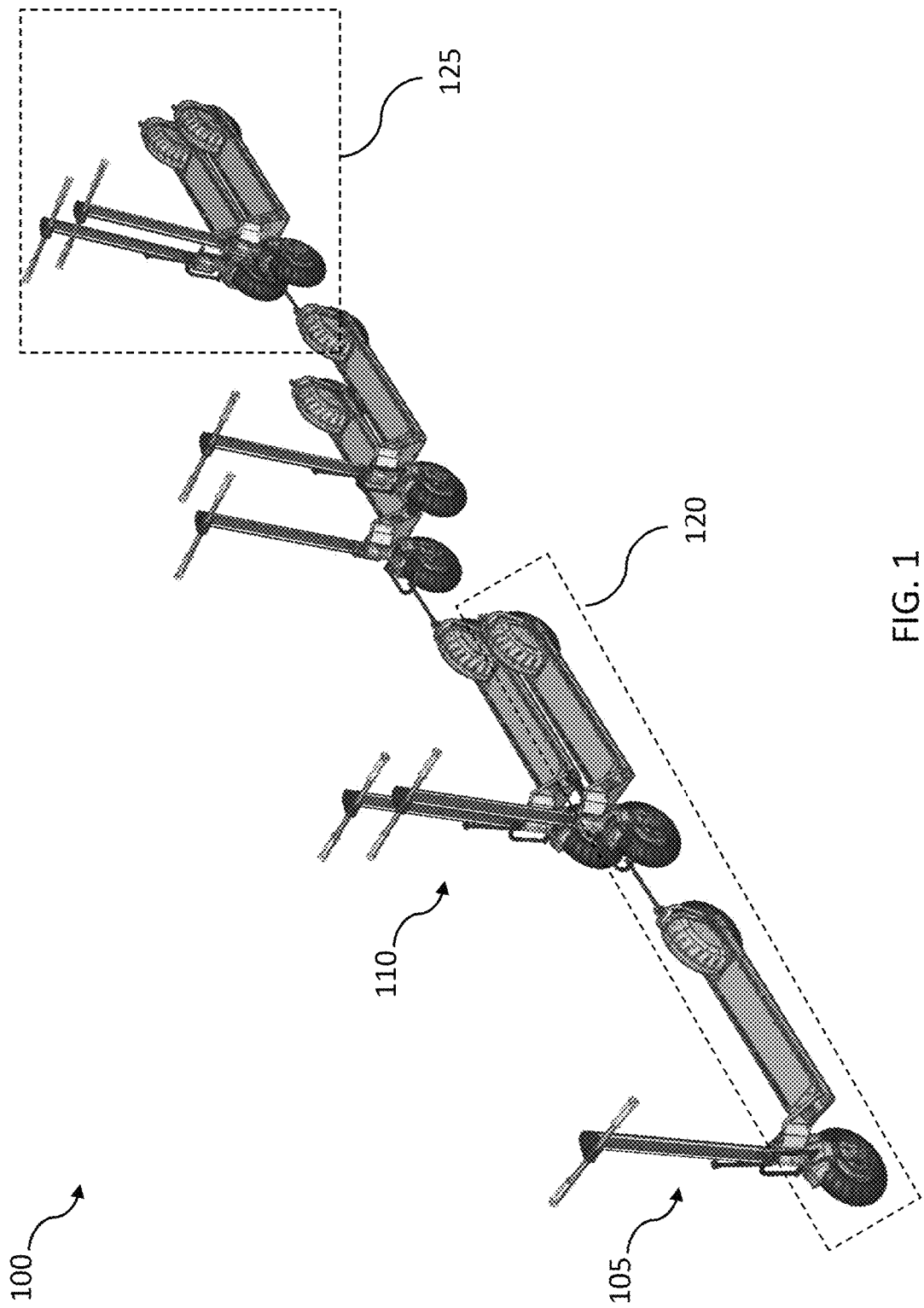
FIG. 1 is a diagram illustrating a group of collected electric scooters.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Systems and methods for collecting electric scooters are described herein. In some embodiments, the systems and methods facilitate a "snaking" configuration of attaching, coupling, or fixing multiple electric scooters to one another. The snaking configuration enables many scooters (e.g., two or more) to be collected together and moved to various locations, such as locations where the electric scooters can be rented, serviced, and so on. Further, the systems and methods enable any scooter to act as a collecting scooter, and thus a scooter share service can manage the collection and provisioning of scooters in a location without special vehicles or equipment, among other benefits.

In some embodiments, an electric scooter is fitted with hardware components that facilitate the vertical (e.g., end to end) or lateral (e.g., side by side) joining of the electric scooter to one or more other electric scooters. For example, an electric scooter can include a chassis containing an electric battery, a controller, and one or more external charging ports, a deck disposed on top of the chassis, a steering tube attached to the chassis, handlebars supported by the steering tube, a front wheel, a back wheel, and one or two hub motors fixed to the front wheel and/or the back wheel and controlled by the controller, and one or more attachment components that facilitate attachment of the electric scooter to another electric scooter.

The attachment components can be bars, arms and/or reception components that move or rotate to fix one electric scooter to another. For example, an electric scooter can have a vertical attachment component (e.g., a wishbone-shaped bar or arm) configured to vertically attach a front portion of the electric scooter to a rear portion of another electric scooter, a vertical reception component (e.g., groove or claw) configured to facilitate attachment of another electric scooter to a rear portion of the electric scooter, and/or a lateral attachment component (e.g., post, swivel bar, rod, and so on) configured to laterally attach the chassis of the electric scooter to a chassis of another electric scooter.

Further, the electric scooter can operate in a collection mode or other neutral mode of operation upon being collected or retrieved. For example, a method of collecting multiple electric scooters from a geographic location can include attaching a first electric scooter to a second electric scooter by vertically attaching a front portion of the second electric scooter to a rear portion of the first electric scooter and attaching a third electric scooter to the second electric scooter by laterally attaching a chassis of the third electric scooter to a chassis of the second electric scooter, and/or attaching a fourth electric scooter to the third electric scooter by vertically attaching a front portion of the fourth electric scooter to a rear portion of the third electric scooter. In some cases, the method causes the first electric scooter, the second electric scooter, the third electric scooter, and/or the fourth electric scooter to operate in a collection mode of operation when attached to the other electric scooters.

In some embodiments, a scooter collection system communicates with a fleet of electric scooters and determines or identifies an order or configuration of the electric scooters when they are collected. For example, a method can identify multiple electric scooters in a geographical area to be collected from the geographical area, determine an order of coupling the identified multiple electric scooters based on current characteristics for the identified multiple electric scooters, and present the determined order of coupling the identified multiple electric scooters to a user that is collecting the identified multiple electric scooters from the geographical area.

Thus, the systems and methods described herein enable an efficient and cost-effective retrieval and collection of electric scooters within a location or area, without requiring additional vehicles, among other benefits. The snaking of electric scooters, therefore, can assist in providing dock-less scooter share services to users by facilitating the retrieval of scooters that have been abandoned or left at disparate locations in an area, among other benefits.

In the following description, for the purposes of explanation, numerous specific details are set forth in order to provide a thorough understanding of implementations of the present technology. It will be apparent, however, to one skilled in the art that implementations of the present technology can be practiced without some of these specific details. The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Examples of Coupling and Collecting Electric Scooters

Several implementations of coupling and collecting electric scooters will now be discussed. FIG. 1 is a diagram illustrating a group of collected electric scooters 100. The group of electric scooters 100 includes a leader electric scooter 105 positioned at a front of a group or snake of scooters. The leader 105 is coupled to trailing or follower electric scooters 110, such as scooters coupled in a vertical configuration 120 or a lateral (horizontal) configuration 125.

As depicted, when electric scooters are grouped, attached, coupled, or fixed laterally, associated vertical attachments can alternate. In other words, a single electric scooter within the snake of scooters, in some cases, can attached to other scooters at two attachment points or fewer. Thus, an electric scooter, in some cases, can attach to one scooter in vertical direction (either front or back) when also laterally attached to another scooter, or can laterally attached to two electric scooters (one on either side of the scooter) without being vertically attached to other scooters.

Further, in some cases, a group or snake of scooters can be limited to 7 or fewer vertically attached scooters (e.g., scooters in the vertical configuration 120) and can be limited to 4 or fewer total scooters (e.g., scooters in the lateral configuration 125). Thus, given the various ways to attach or couple scooters to one another, a snake or group of electric scooters can be utilized to collect small groups of scooters (e.g., two to ten scooters) and also accommodate many scooters (e.g., ten or more) when being collected and moved out of a collection location or area.

Examples of Suitable Electric Scooters

Figure 2A:
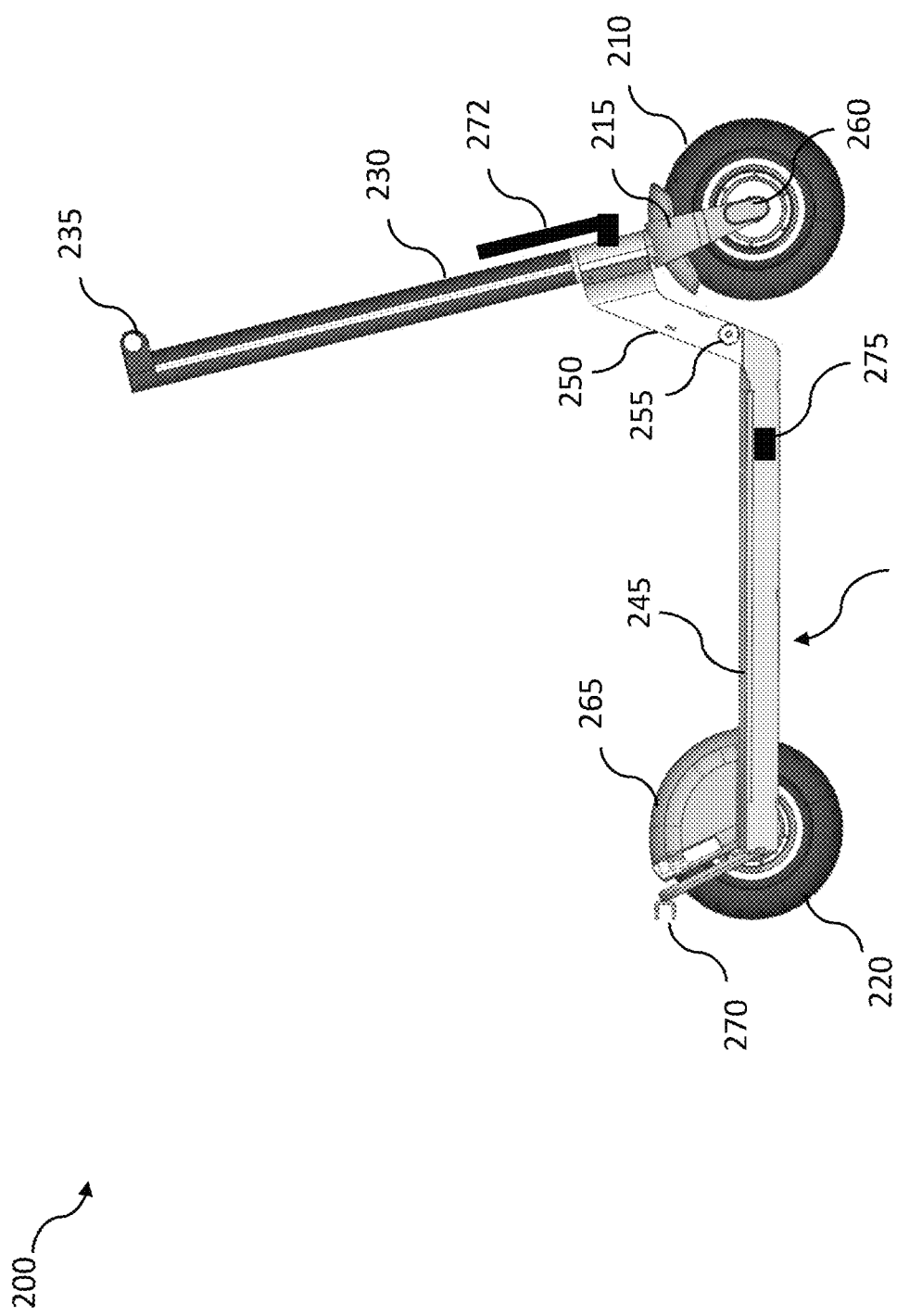
FIGS. 2A-2B are diagrams illustrating a suitable electric scooter.
Figure 2B:
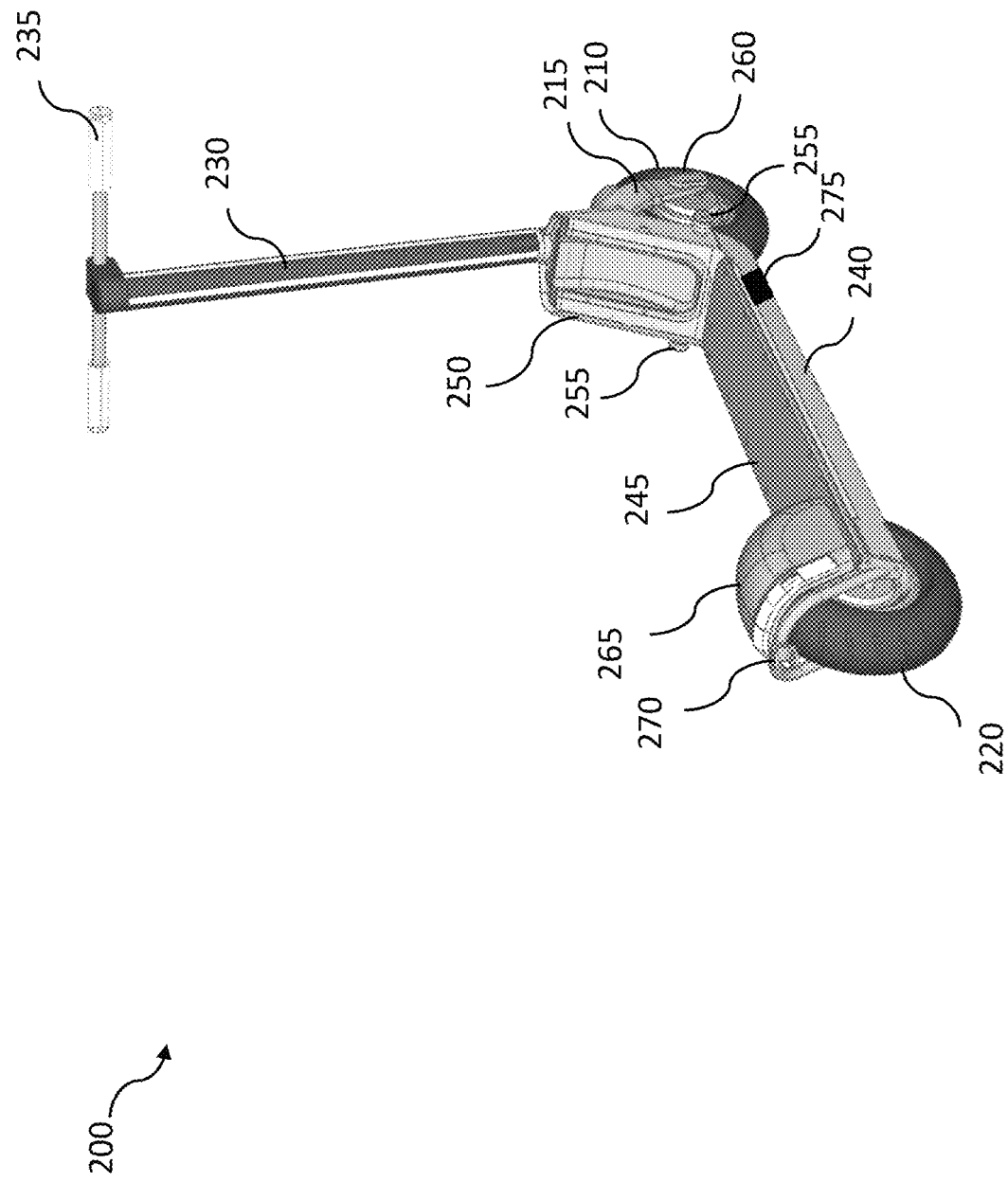

FIGS. 2A-2B depict an electric scooter 200 suitable for being coupled, fixed, attached, or connected to other electric scooters. The electric scooter 200 is generally a powered stand-up scooter, propelled by an electric motor. Electric scooters can also be referred to as electric kick scooters, e-scooters, motorized scooters, and so on. Typically, an electric scooter includes two (or more) small wheels (e.g., hard or solid tires, air tires, foam filled tires), such as a front wheel 210 and a rear wheel 220. For example, an electric scooter can have two wheels (e.g., one front and one rear), three wheels (e.g., two front wheels), four wheels (e.g., two front and two rear wheels), and so on. Further, the electric scooter 200 includes a foldable or non-foldable steering tube 230 that supports handlebars 235 and extends to a fork 215 that fixes the front wheel 210 to the scooter 200.

The scooter 200 also includes a chassis 240 having a deck 245 that supports a rider of the scooter 200 (e.g., the rider stands on the deck 245). The scooter 200 can also include a down tube connected to a head tube, inside of which turns the steering tube 230 connects to a stem attached to the handlebars 235. The steering tube 230 can extend through the chassis 240 to the fork 215. In addition, the electric scooter 200 can include fenders 265, trailer hitches, brakes, lights, and other accessories or components.

The electric scooter 200 can include a housing 250 that contains a transmission or drive system, a control system or controller, a braking system, a suspension system, and a battery pack or packs, and an electric motor 260, such as a front and/or back wheel hub motor. In some cases, some or all of the components or systems can be contained by the housing 250, the chassis 240, or both. A charging post or port 255 is attached to the housing 250.

The electric scooter 200 may also include various computing systems and components, such as the various computing systems described herein, GPS or positioning systems, communication components, and so on. For example, an electric scooter can include computing systems and identification components that facilitate or enable the electric scooter as an Internet of Things (e.g., IoT) device networked to other scooters and one or more control or communication systems.

The systems, components, and techniques introduced here can be implemented by electric scooters, docking stations, and/or associated systems as or via special-purpose hardware (for example, circuitry), as programmable circuitry appropriately programmed with software and/or firmware, or as a combination of special-purpose and programmable circuitry. Hence, implementations can include a computer- or machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

In some embodiments, the electric scooter 200 also includes attachment components, such as a rear attachment component 270, a front attachment bar or arm 272, and a lateral attachment component 275. As described herein, the rear attachment component 270 can be a groove, claw, or other device or mechanism configured to receive an arm or bar from another scooter when the electric scooter 200 is vertically attached to the other scooter.

The front attachment bar or arm 272 can be configured into a variety of shapes, such as a bar shape, a wishbone-shape, and so on. The front attachment bar or arm 272 is fixed or attached to the steering tube 230 of the electric scooter and/or other components that rotate or swivel, such as the fork 215. As described herein, the front attachment bar or arm 272 can move into multiple position, such as a vertical position (e.g., parallel to a long axis of the steering tube 230) when the electric scooter 200 is not attached to another scooter, and a horizontal or extended position when the electric scooter 200 is vertically attached to another scooter.

The lateral attachment component 275 facilitates a lateral or horizontal attachment of the electric scooter 200 to other scooters. For example, the lateral attachment component 275 can be a rod, arm, or bar that extends, swivels, or rotates to be fixed between scooters in order to couple the scooters to one another (e.g., coupling the chassis of one scooter to the chassis of another scooter). In some cases, the lateral attachment component 275 is a separate or external component, that attaches to external components (e.g., a charging port 255 of the scooters when laterally coupling scooters to one another.

Examples of Coupling or Attaching Electric Scooters

In some implementations, the electric scooters can be configured and/or designed to facilitate a snaking of scooters when coupled together. This "snaking" enables the scooters to be coupled as a train of multiple scooters. Snaking can include attaching scooters together vertically, or at or near a main chassis with each other, where there is around 1 degree of freedom from each other (e.g., a low degree of warp).

Figure 3A:
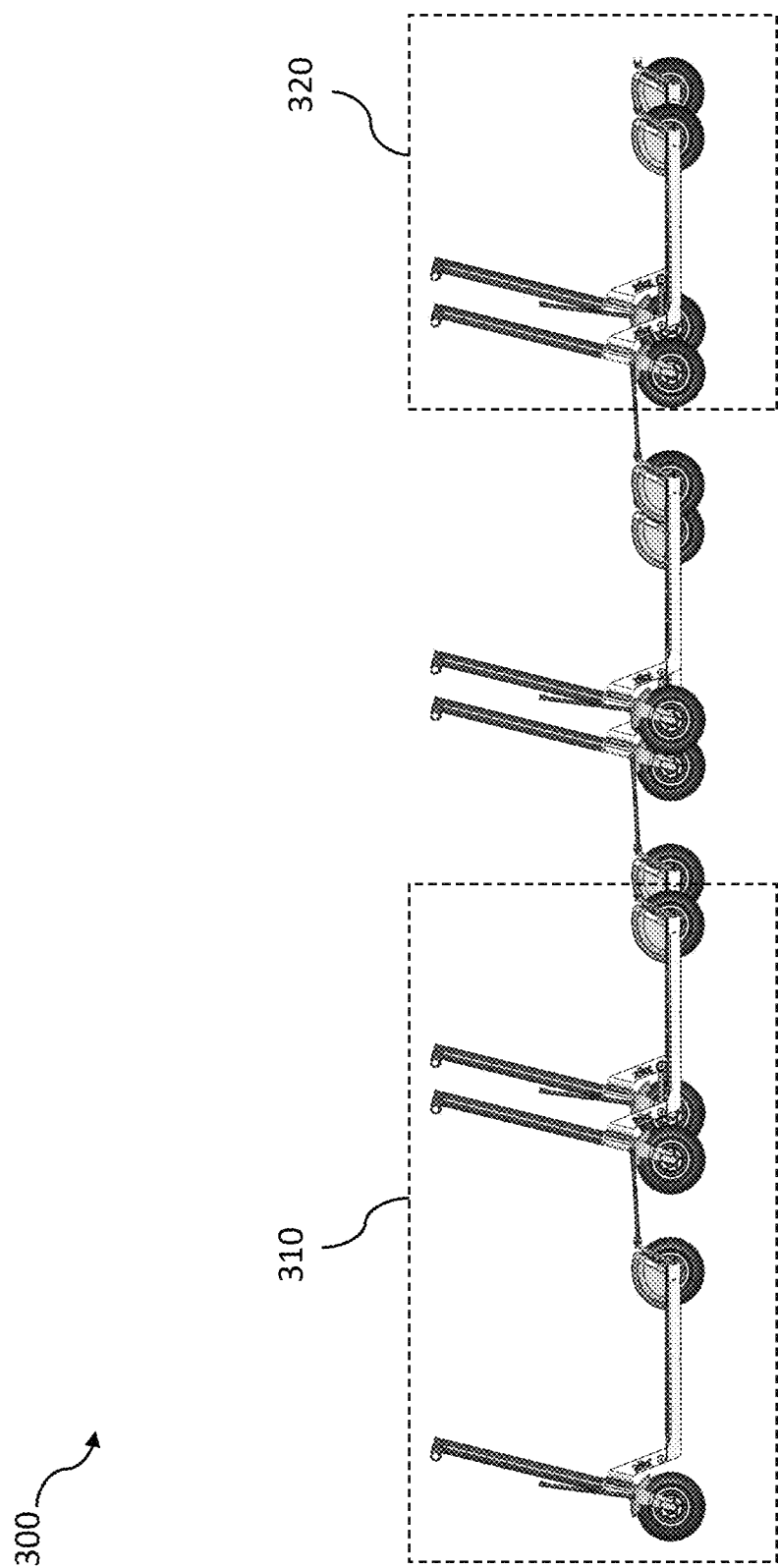
FIGS. 3A-3B are diagrams illustrating a snaking configuration for electric scooters.
Figure 3B:
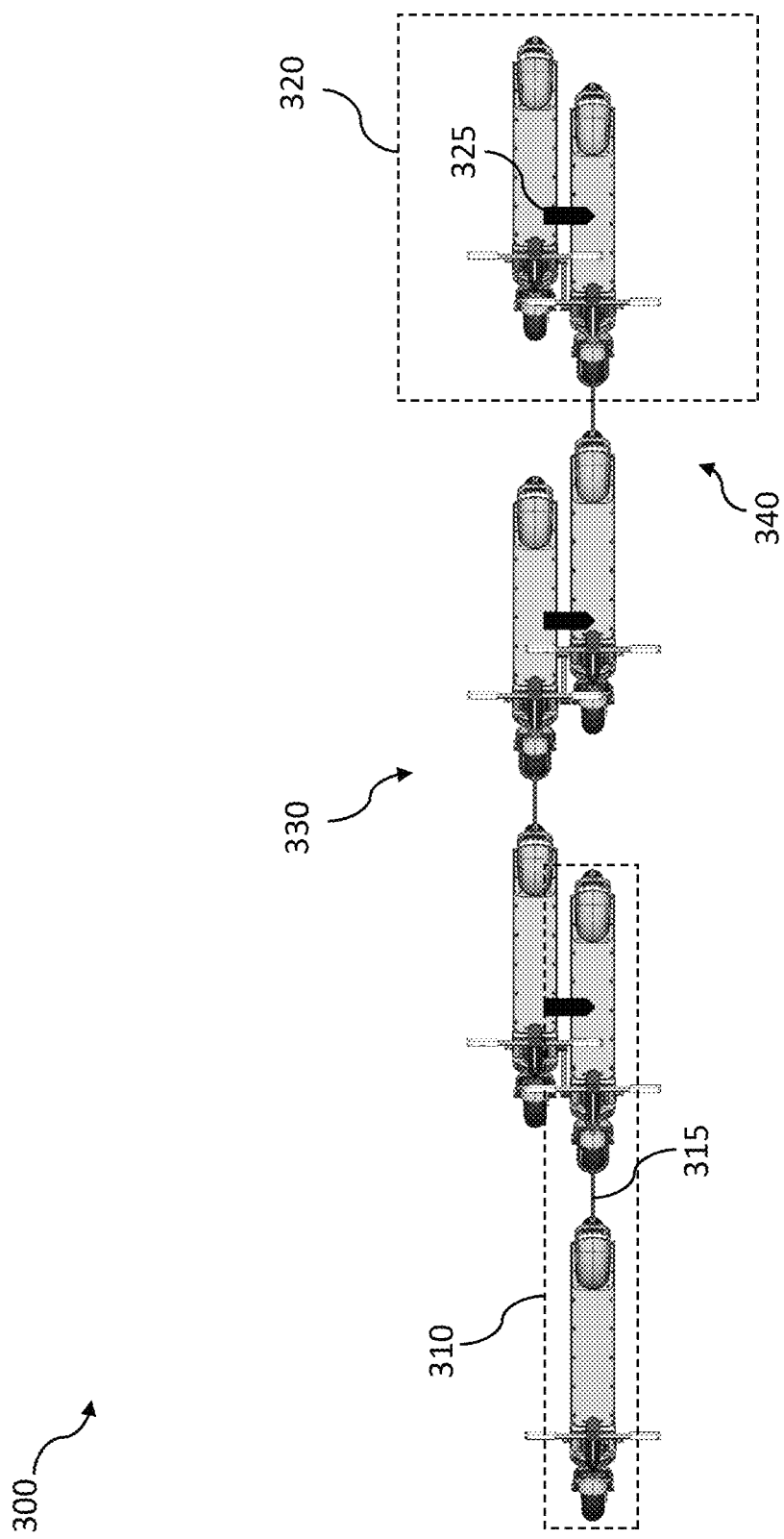

As described herein, in some embodiments, the collecting of electric scoters includes connecting scooters in vertical or lateral configurations or directions. FIGS. 3A-3B are diagrams illustrating a snaking configuration 300 for electric scooters. The snaking configuration 300 includes electric scooters attached, connected, fixed, and/or coupled in a vertical configuration 310 (via a vertical attachment component 315) and/or a lateral configuration 320 (via a lateral attachment component 325).

In some cases, the snake configuration 300 is formed by groups of electric scooters vertically connected being alternately coupled in the lateral direction to maintain a narrow or defined column of scooters. For example, as depicted in FIG. 3B, both scooters of a vertical coupling of scooters 330 are laterally attached to other scooters via a left side of the scooters (e.g., attached at a left side of a chassis the scooters), whereas both scooters of a different vertical coupling of scooters 340 are laterally attached to other scooters via a right side of the scooters. In such a configuration, the snake maintains a two-scooter sized width by alternating the attachment sides of the vertical groups of scooters.

Of course, the snake configuration 100 can take on various other configurations or sizes, including widths that are four or more scooters wide, or lengths that are two or more scooters long (e.g., upwards of ten or more scooters)

Thus, by providing scooters that include attachment components configured to vertically and/or laterally attach to other scooters, the systems and methods described herein can facilitate collecting scooters utilizing such configurations. For example, a method of collecting multiple electric scooters from a geographic location can include attaching a first electric scooter to a second electric scooter by vertically attaching a front portion of the second electric scooter to a rear portion of the first electric scooter and attaching a third electric scooter to the second electric scooter by laterally attaching a chassis of the third electric scooter to a chassis of the second electric scooter. Then, if an additional scooter is to be collected, the method can attach a fourth electric scooter to the third electric scooter by vertically attaching a front portion of the fourth electric scooter to a rear portion of the third electric scooter.

In some cases, the method causes the first electric scooter, the second electric scooter, and/or the third electric scooter to operate in a collection mode of operation when attached to the other electric scooters. For example, the method can cause the first electric scooter to operate in a leader collection mode of operation when attached to the other electric scooters and cause the second electric scooter and the third electric scooter to operate in a follower collection mode of operation when attached to the other electric scooters. Further details regarding modes of operation for electric scooters when being collected are described herein.

As described herein, an electric scooter can include a chassis containing an electric battery, a controller, and one or more external charging ports, a deck disposed on top of the chassis, a steering tube attached to the chassis, handlebars supported by the steering tube, a front wheel, a back wheel, and a hub motor fixed to the back and/or front wheel and controlled by the controller, and one or more attachment components that facilitate attachment of the electric scooter to another electric scooter. In some cases, the attachment components include a vertical attachment component configured to vertically attach a front portion of the electric scooter to a rear portion of another electric scooter and a vertical reception component configured to facilitate attachment of another electric scooter to a rear portion of the electric scooter.

Figure 4A:
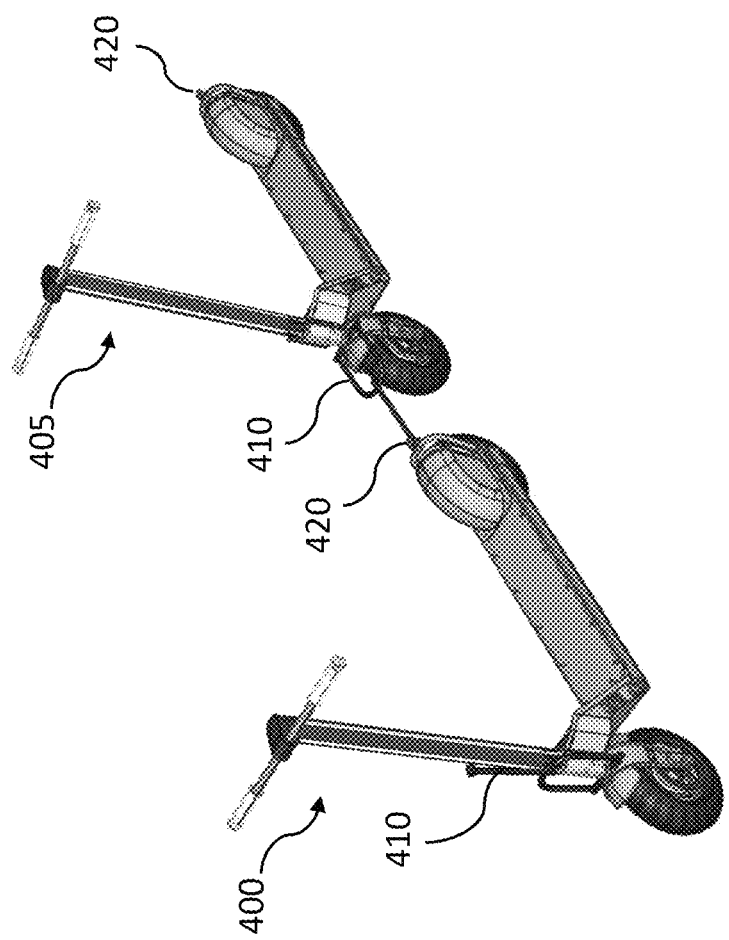
Figure 4B:
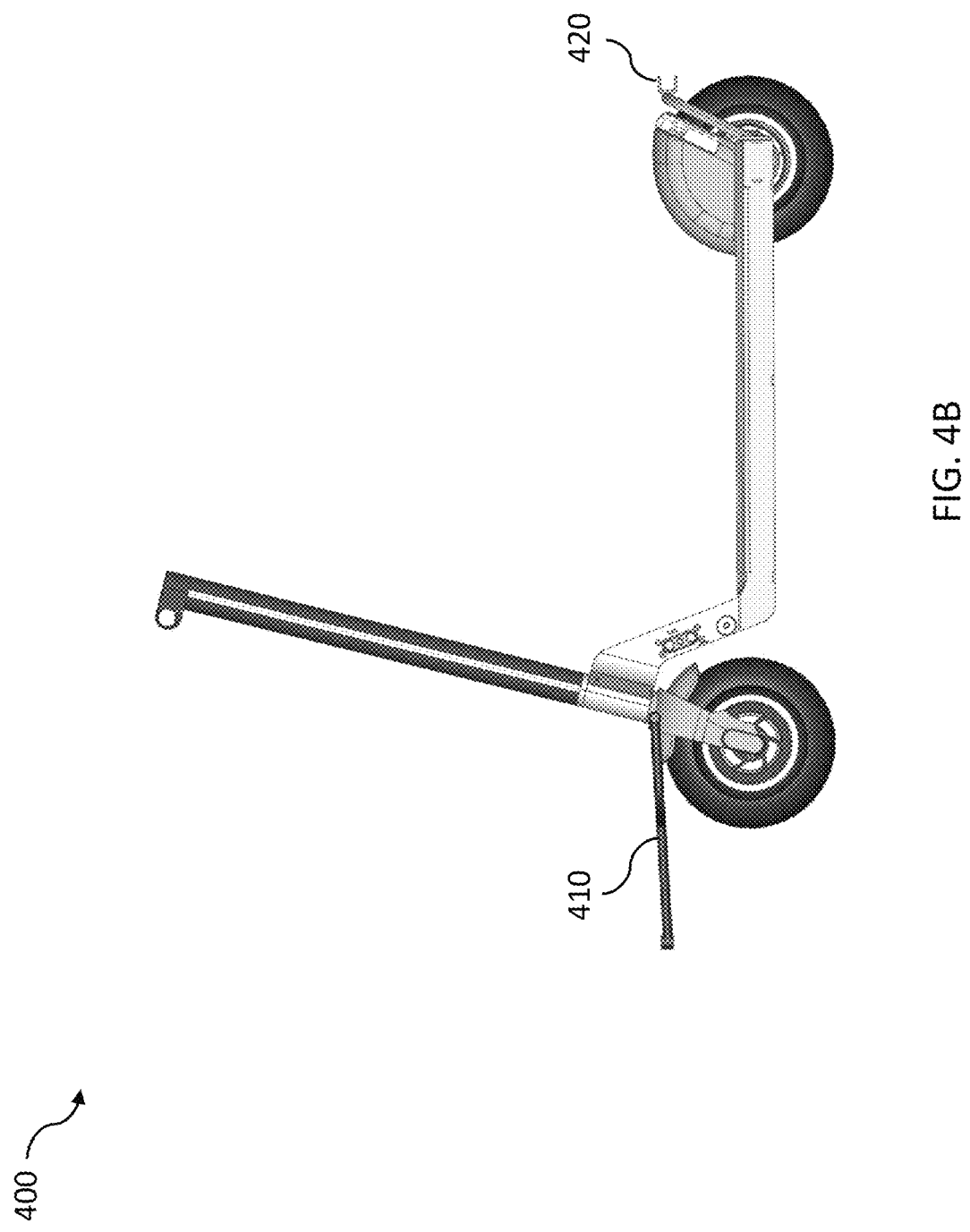

FIGS. 4A-4C depict the vertical attachment of electric scooters. In FIG. 4A, an electric scooter 400 is vertically attached or coupled to another electric scooter 405. A vertical link bar or arm 410, fixed to a front portion of the electric scooter 405, is in an extended (coupling) position and attached to a rear link component 420 (e.g., a ball joint) of the electric scooter 400. For example, the vertical link bar 410 can have a wishbone shape, where each portion of a U-shape attachment section is attached to either side of a steering tube of the electric scooter 400, 405.

For example, the rear link component 420 can act as a hitch and is shaped to receive an extended end of the link bar 410, which attaches or is otherwise removably fixed to the rear link component 420. For example, the extended end can include a cap or knob, which prevents movement of the link bar 410 when the link bar 410 slides into an opening of the real link component 420. Thus, the electric scooter 405, in some cases, is hitched to the electric scooter 400 in a vertical direction.

FIG. 4B depicts the vertical link bar 410 in an extended or hitching position. FIG. 4C depicts the vertical link bar 410 in a stowed or vertical position, where the link bar 410 is oriented parallel to a long axis of the steering tube of the electric scooters 400, 405. In such a position, the link bar 410 is stowed when the electric scooter is being driven by a rider. In the extended position, the vertical link bar 410 is in a hitching or attachment position, where the electric scooter can hitch to another electric scooter via the link bar 410.

Thus, in some embodiments, the electric scooter can include the vertical link bar 410, which is movably fixed to the steering tube and shaped to link to a rear portion of another electric scooter, and a rear link component (e.g., a rear hitch) 420 that is fixed to a rear portion of the chassis and configured to receive the vertical link bar 410 of another electric scooter. The vertical link bar 410 can have a wishbone shape that attaches to the steering tube of the electric scooter such that it can be moved into multiple positions, including a collection or extended position, in which the vertical link bar 410 extends in a horizontal direction away from the steering tube, and a ride or stowed position, in which the vertical link bar 410 extends in a vertical direction parallel to a long axis of the steering tube.

Thus, the scooters can be coupled side by side via a ball joint and a vertical swivel between scooters (e.g., between a scooter in front and behind the scooter). The vertical swivel joint is attached to the fork or stem (e.g., link bar 4100 and the ball joint component 420) on the rear of a scooter ahead of the scooter. Thus, each scooter in the snake follows the path of the scooter ahead of it, while also being able to move enough to navigate bumps in the terrain.

In some cases, the attachment components of the electric scooter include a lateral attachment component configured to laterally or axially attach the chassis of the electric scooter to a chassis of another electric scooter. The lateral attachment component can attach one chassis to another in a staggered fashion (where one scooter is slightly more forward than the other), which allows one scooter to follow another scooter while they are laterally or axially connected.

The electric scooters, coupled together, can form a parallel path to each other when transported, while also moving within that degree of freedom to navigate bumps and irregularities in a road surface along which they are being transported.

Figure 5A:
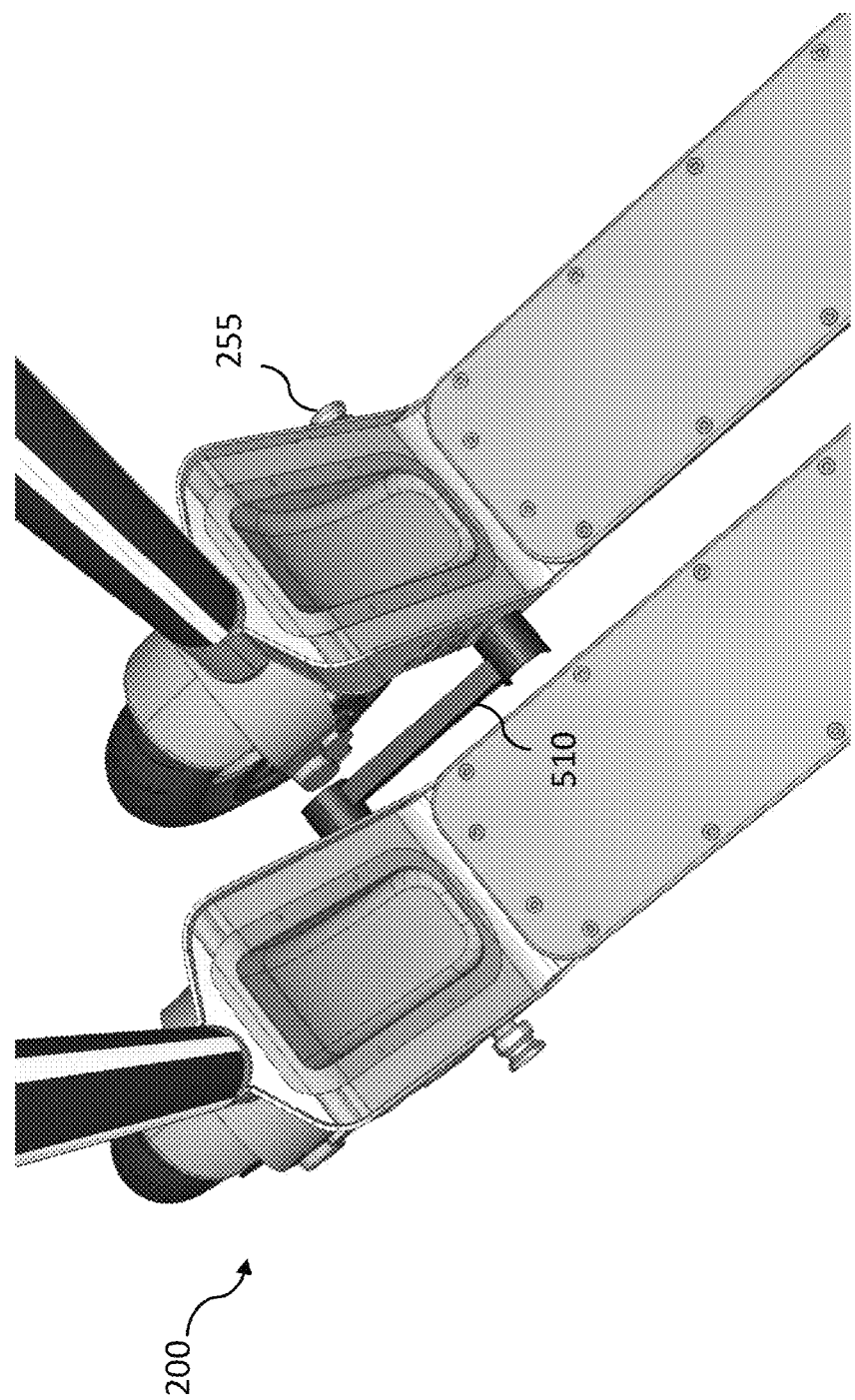
FIGS. 5A-5C are diagrams illustrating lateral coupling of electric scooters using a charging port connector.
Figure 5B:
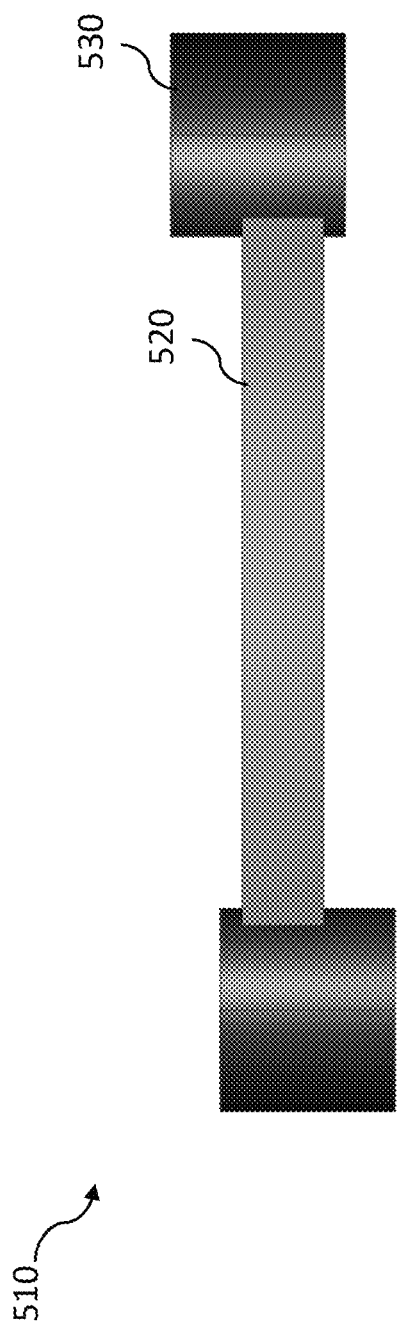
Figure 5C:
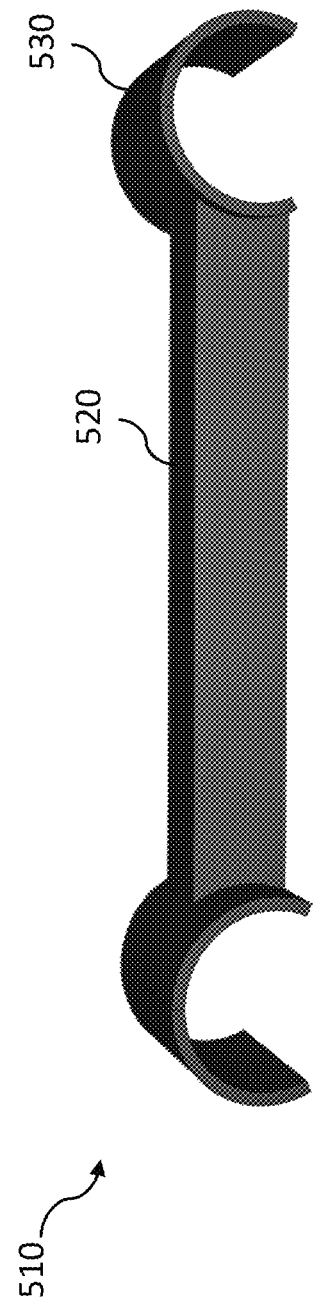

FIGS. 5A-5C are diagrams illustrating lateral coupling of electric scooters using a charging port connector. In FIG. 5A, an external span bar 510 attaches to an external charging port 255 of the electric scooter 200 and an external charging port 255 of another electric scooter 200 to laterally attach the chassis of the electric scooter to a chassis of the other electric scooter.

The external span bar 510 is shown in FIGS. 5B-5B. The bar 510 includes connection ends 530 disposed at ends of a connection arm 520. The connection ends 530 are shaped to wrap at least partially around the charging ports 255 of the electric scooter 200. Further, the ends 530 are positioned on the connection arm 520 in an offset spacing from one another, allowing for a staggered coupling of two scooters (e.g. one leading the other), while also providing sufficient spacing between the scooters.

Figure 6A:
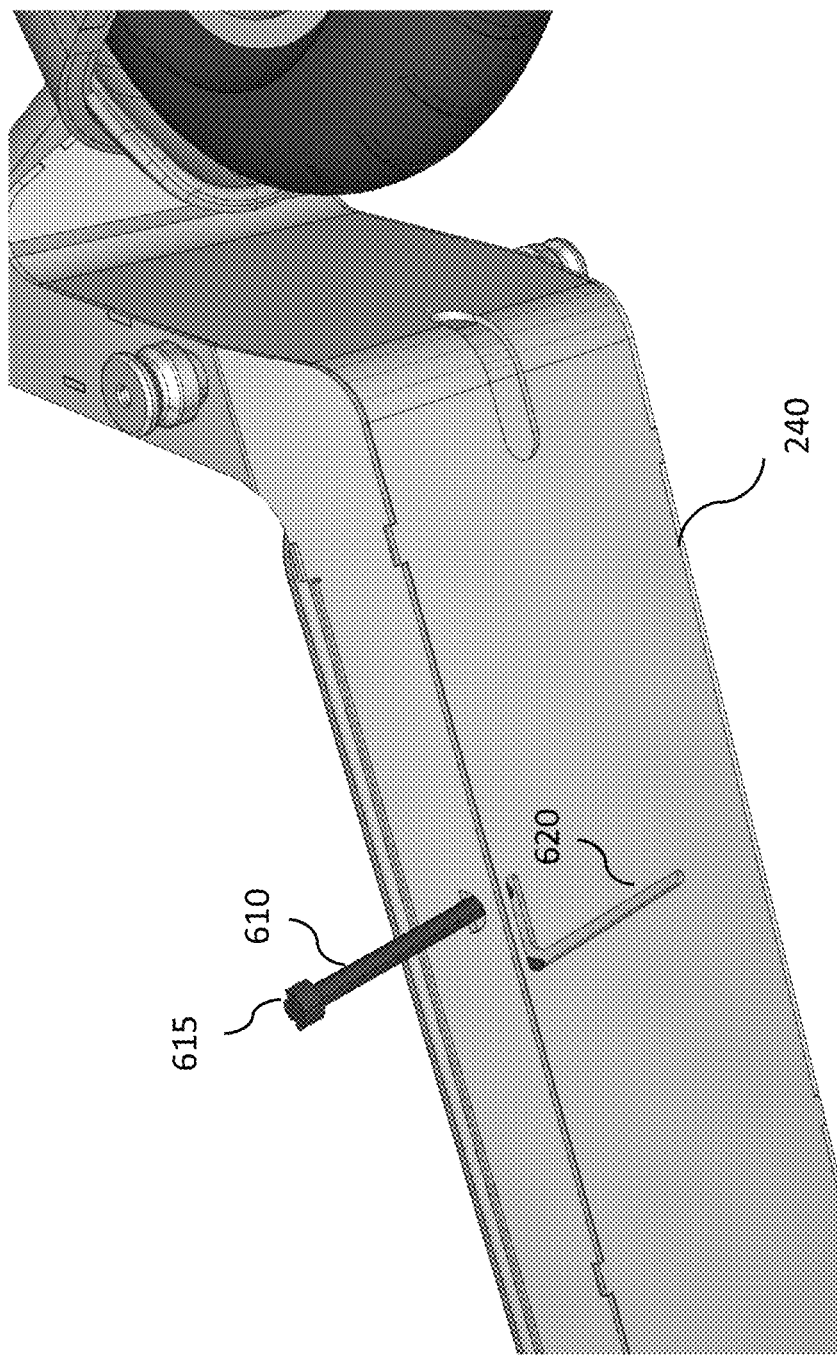
FIGS. 6A-6B are diagrams illustrating lateral coupling of electric scooters using an integrated connecting rod.
Figure 6B:
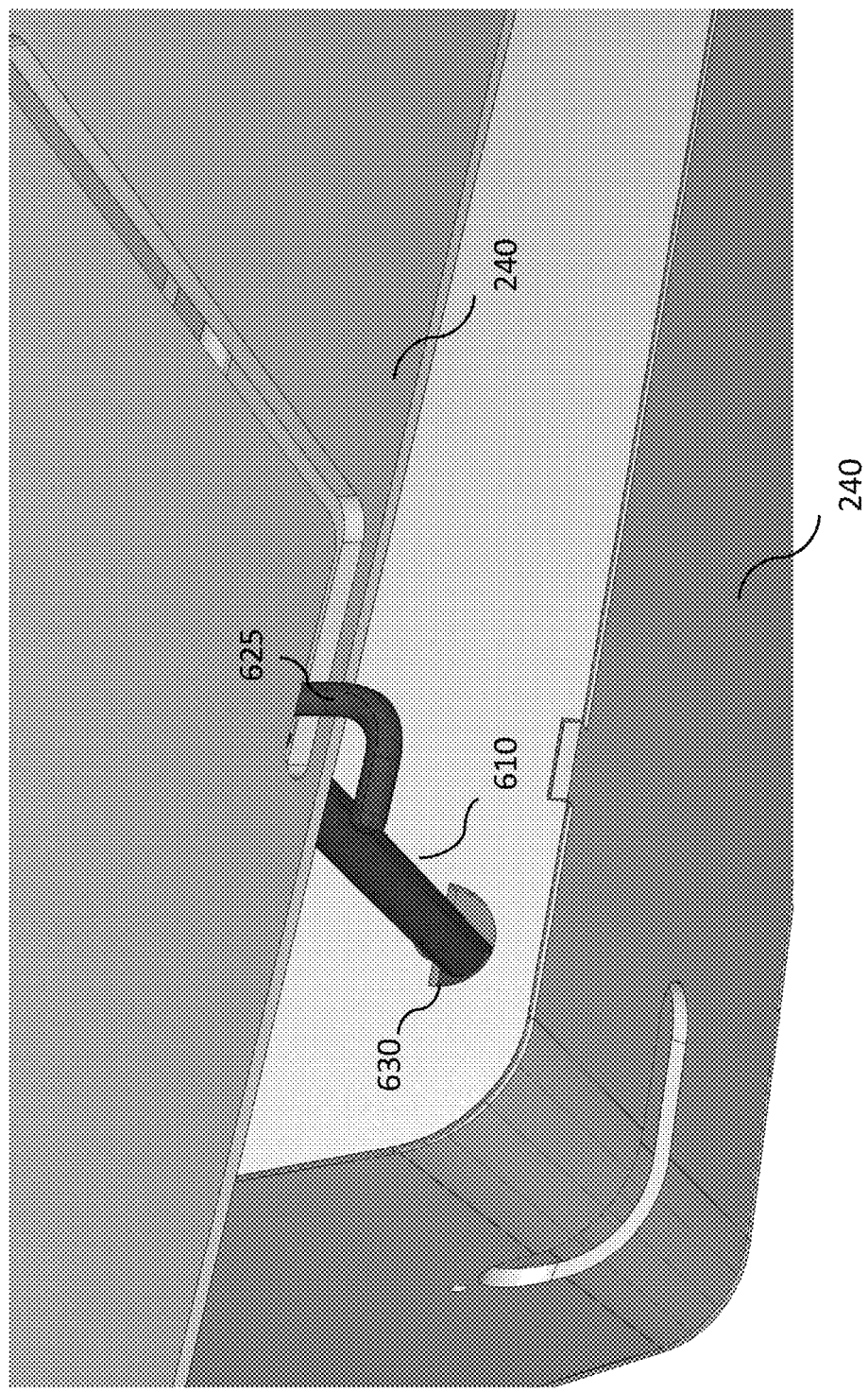
Figure 7A:
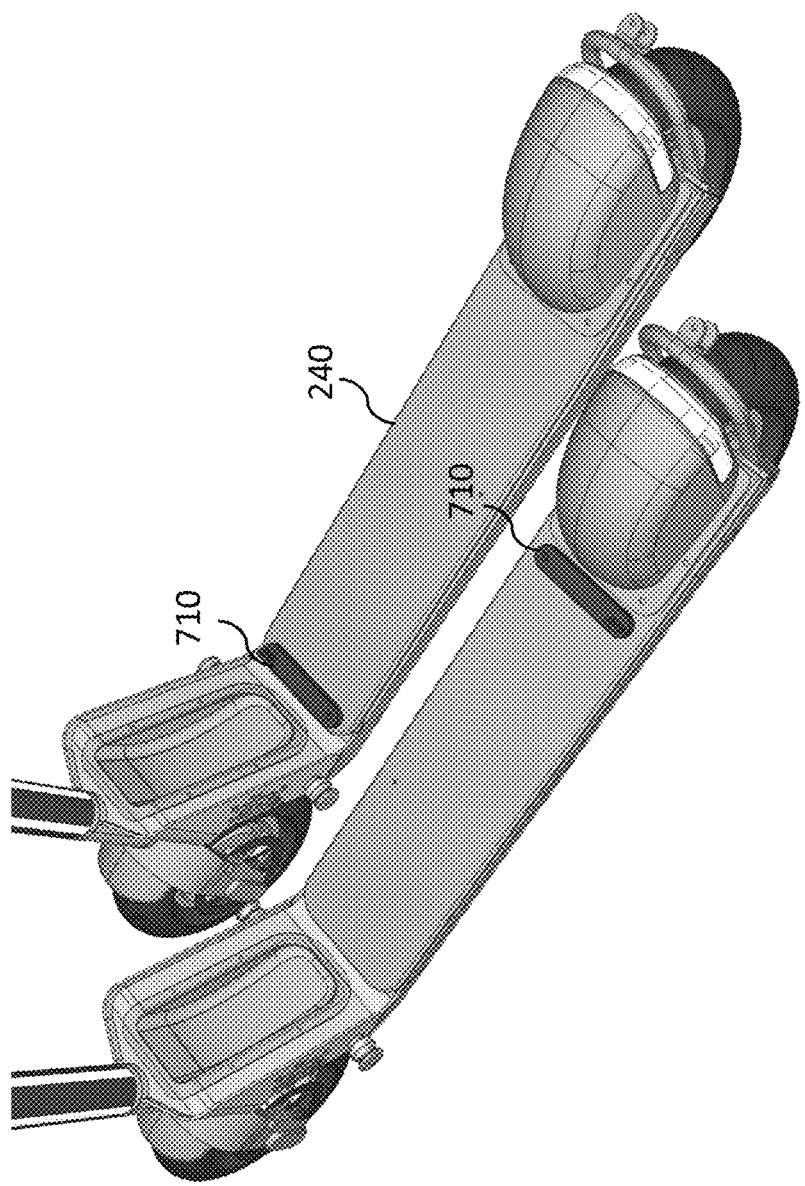
FIGS. 7A-7D are diagrams illustrating lateral coupling of electric scooters using an integrated swivel connector.
Figure 7B:
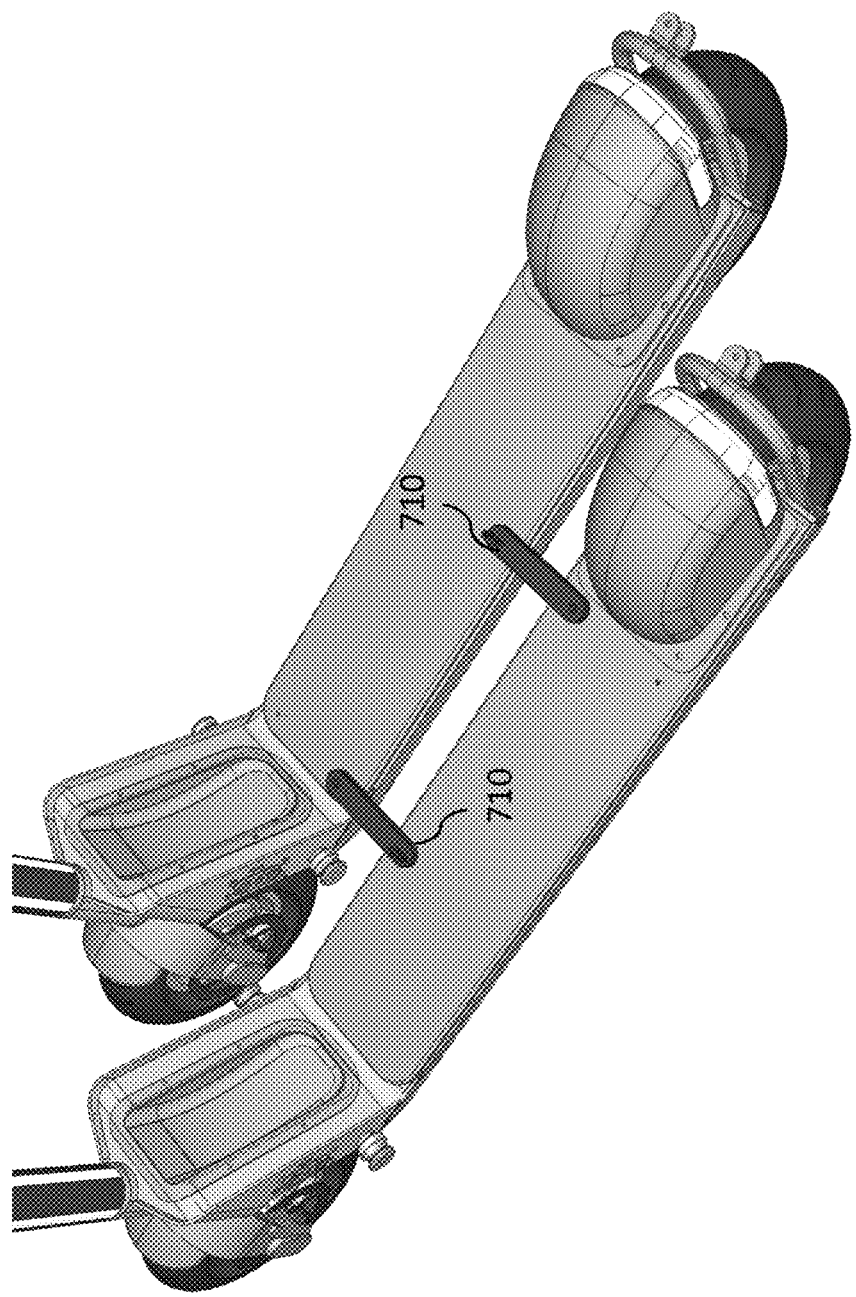
Figure 7D:
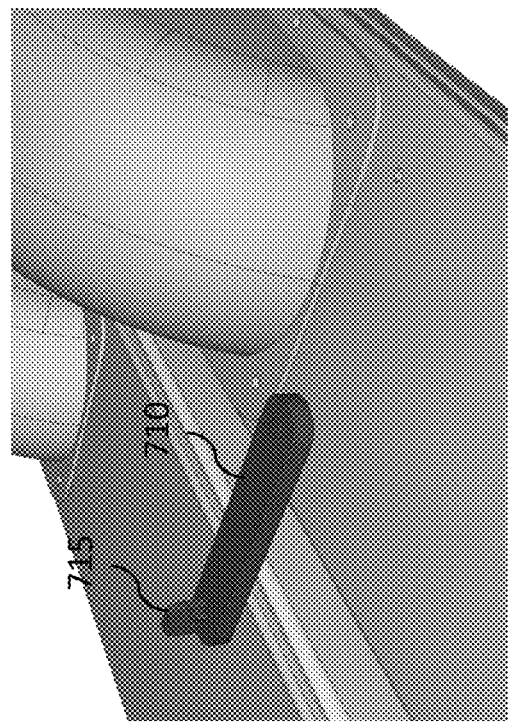
Figure 7C:
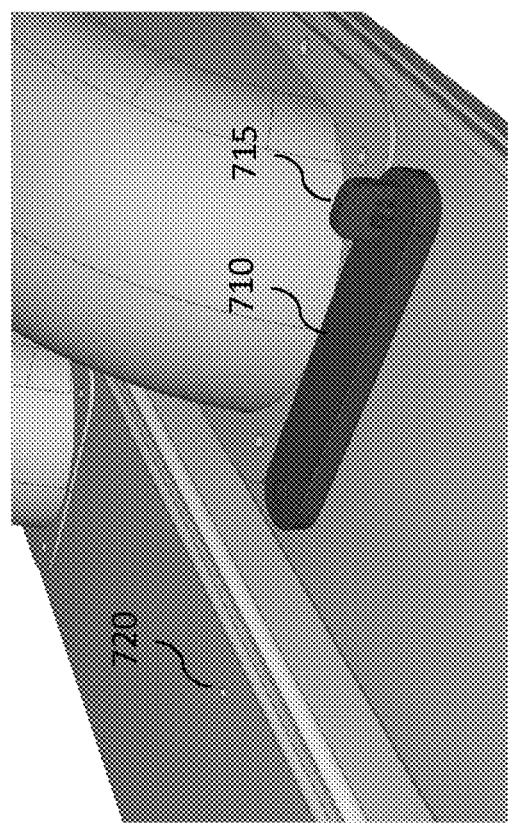

FIGS. 6A-6B are diagrams illustrating lateral coupling of electric scooters using an integrated connecting rod 610. The connecting rod 610 extends from an internal area 620 of the chassis 240 (such as proximate to a kick stand) and is configured to laterally attach the chassis of the electric scooter to a chassis of another electric scooter. For example, the rod 610 includes an end cap 615 that, when the rod 610 is rotated using a rotation bar 625, causes the rod 610 to be fixed within a reception port or opening 630 of the chassis of the other electric scooter.

FIGS. 7A-7D are diagrams illustrating lateral coupling of electric scooters using an integrated swivel connector 710. The swivel connector 710 or bar is fixed to the deck 245 of the chassis 240 and rotates from the deck of the chassis to laterally attach the chassis of the electric scooter to a chassis of another electric scooter.

For example, the swivel bar 710 can include a swivel end 715 that has a locking pin or coupling mechanism. When rotated and positioned over the deck of another scooter, the end 715 can be inserted with reception port, opening, or hole 720 of the other scooter, such as a hole disposed with the deck of the other scooter. In some cases, a scooter can include two or more swivel bars 710, and the scooters are laterally attached via one or more of the swivel bars 710, or each swivel bar 710 is used to couple to a different scooter.

In some cases, a three-wheel or four-wheel scooter can also utilize lateral attachment components to form a grouping of scooters. These scooters can utilize the lateral attachment components described herein. Further, since these scooters often have two front wheels, one scooter can be positioned above another scooter (e.g. raised with respect to the other scooter), with the lateral attachment components attaching the chassis of the raised scooter to the chassis of the scooter on the ground (to avoid the wheels from getting in the way of the coupling).

Examples of Controlling Electric Scooters

As described herein, in some embodiments, the systems and methods facilitate the efficient and enhanced collection of electric scooters from various areas or locations. The systems and methods can utilize a scooter management system, such as a system that communicates with electric scooters and performs various processes associated with managing, collecting, and snaking the electric scooters.

Figure 8:
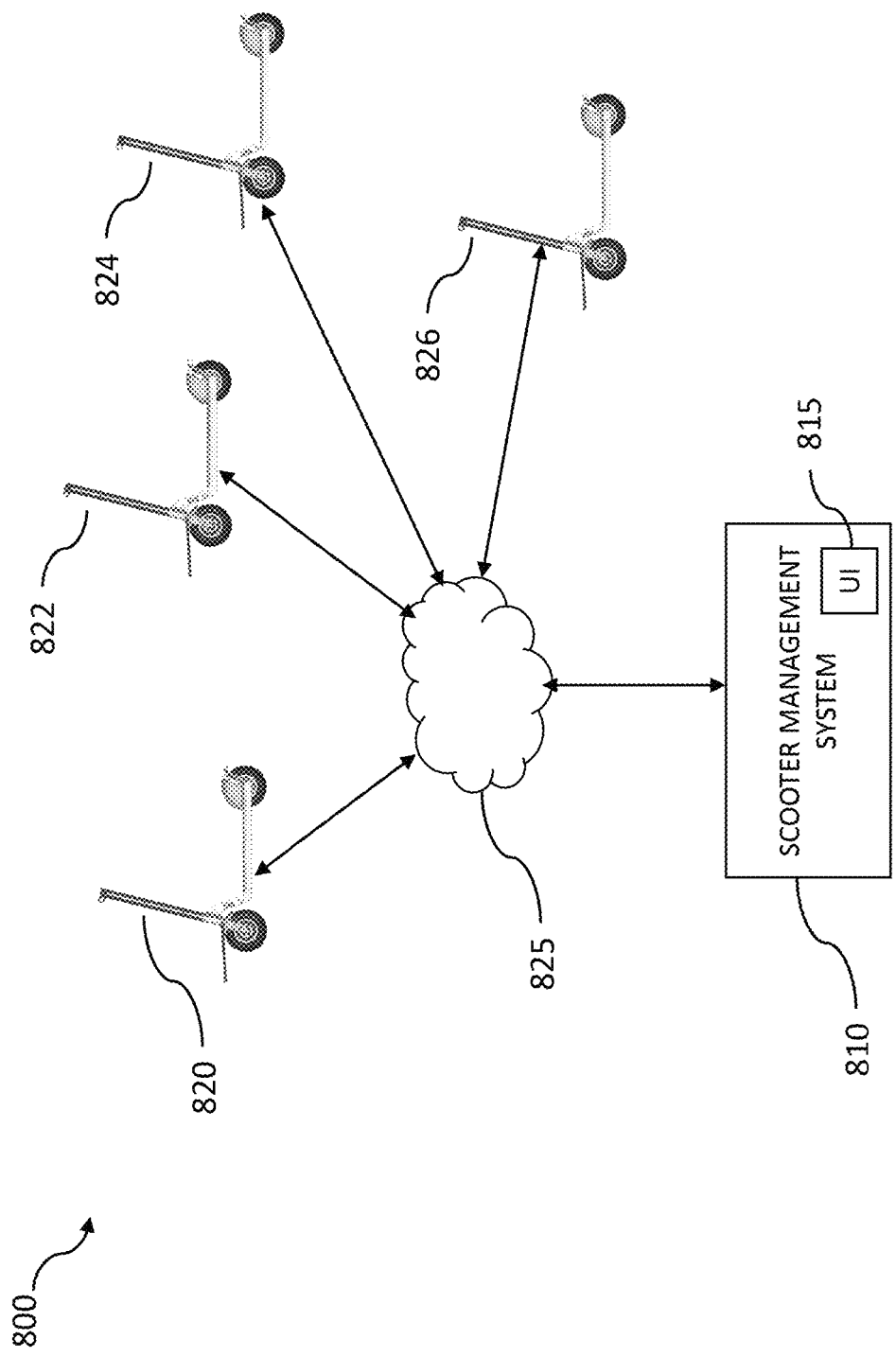
FIG. 8 is a diagram illustrating a scooter management system and associated electric scooters.

FIG. 8 is a diagram 800 illustrating a scooter management system 810 and associated electric scooters 820-826. In some cases, the scooter management system 810 and the scooters 820-826 are part of a scooter share service or other fleet of scooters, such as a fleet of scooters provided by a delivery company.

The scooter management system 810 includes various components configured to communicate with the scooters 820-826 over a network 825, such as a wireless or cellular communications network. As described herein, the scooters 820-826 can act as IoT devices managed by the system 810.

In some cases, the system 810 includes a user interface 815, which provides information about the managed electric scooters 820-826 and/or receives input from users to facilitate performing management actions on behalf of the scooters 820-286 and/or the associated fleet or scooter share service. For example, the system 810 can perform various actions associated with collecting the electric scooters 820-826, such as location identification of the scooters, capturing certain use characteristics of the scooters, determining a current charge level of the batteries of the scooters, and so on.

Figure 9:
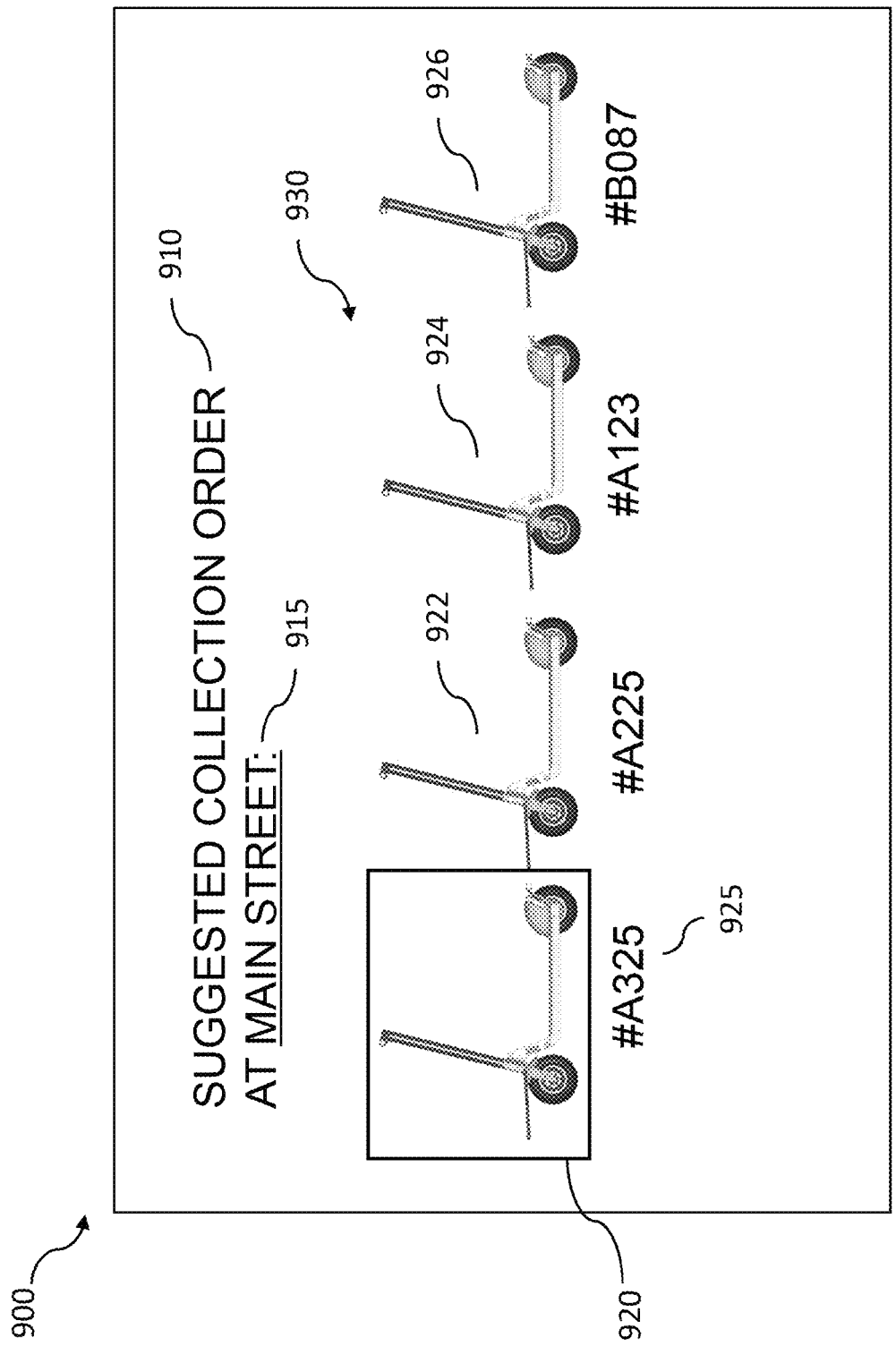
FIG. 9 is a display diagram illustrating an example user interface presented to a collector of electric scooters.

FIG. 9 is a display diagram illustrating an example user interface 900 presented to a collector of electric scooters. The collector, having access to the user interface 815 of the scooter management system 810 (via a mobile application on a tablet, laptop, smart phone, or other mobile device), can provide input that initiates a scooter collection event for one or more scooters.

The interface performs an action or process to identify multiple electric scooters in the geographical area to be collected from the geographical area, determine an order of coupling the identified multiple electric scooters based on current characteristics for the identified multiple electric scooters, and present the determined order of coupling the identified multiple electric scooters to a user that is collecting the identified multiple electric scooters from the geographical area.

For example, the user can enter a location ("main street") into the user interface 815. The system 810 searches for scooters to be collected and presents information 910 that identifies the scooters (e.g., scooter ID 925) to be collected 920-926 at the location 915. Further, the system 810 polls or otherwise accesses characteristics about the scooters 920-926 to determine an order 930 of coupling the scooters in the snake or connection configuration. The user interface can then present the suggested or determined order 930 of coupling, identifying a leader scooter (e.g., scooter #A325) and other trailing scooters (e.g., #A225, #A123, #6087).

The system 810 can order the scooters in a variety of ways. For example, the system 810 can select a scooter as a leader scooter when the scooter has the highest relative level of charge, the highest relative torque function, or when the scooter is closest to the collector. The system 810 can order scooters based on charge levels (e.g., highest charged scooters are placed at a front and back of the grouping), based on common generation/make/type, and so on.

In some cases, sufficiently charged electric scooters can assist other scooters having low battery levels, which can may utilize slight amounts of regenerative motor braking to recharge their batteries to a survival level or sufficient charge level. Also, the electric scooter can emit a certain color of light, for a certain duration, when coupled or in collection mode, to assist in safely communicating a size of the grouping of scooters, a direction to be traveled, a braking occurrence, and/or to represent the brand of scooter, the share service, the fleet, and other entity providing the scooter.

Figure 10:
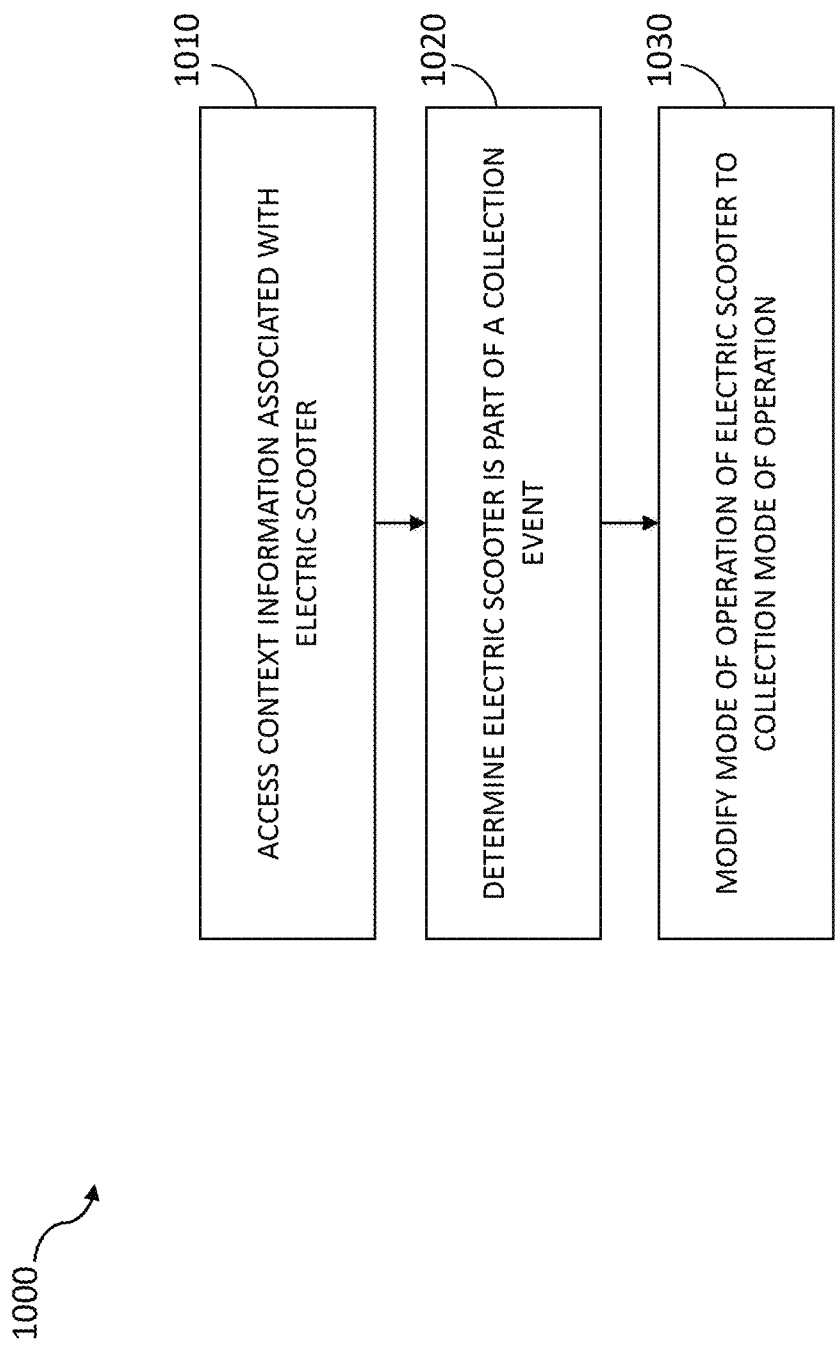
FIG. 10 is a flow diagram illustrating an example method for operating an electric scooter.

As described herein, in some embodiments, an electric scooter can operate in a collection mode of operation, such as when the scooter is part of a snake configuration or otherwise coupled to one or more other scooters. FIG. 10 is a flow diagram illustrating an example method 1000 for operating an electric scooter. Aspects of the method 1000 may be performed by an electric scooter and, accordingly, is described herein merely by way of reference thereto. It will be appreciated that the method 1000 may be performed on any suitable hardware, such as the scooter management system 810.

In operation 1010, an electric scooter accesses context information associated with the scooter. For example, the electric scooter 400 can determine another electric scooter 405 is proximate to and/or coupled to the electric scooter 400. As another example, the electric scooter can determine that the scooter has been identified by the system 810 as in collection mode, or can determine an attachment component (e.g., link bar 410) has been moved to an attachment position.

In operation 1020, the electric scooter determines it is part of a collection event. For example, based on the context information or actions performed with components of the scooter, the scooter 400 determines it is being collected with one or more other scooters.

In operation 1030, the electric scooter modifies a current mode of operation to a collection mode of operation. For example, the electric scooter 400 causes its drive train or hub motor to switch to a neutral mode of operation. Thus, in some cases, the controller of the electric scooter 400 is configured to cause the hub motor to operate in a collection mode of operation upon engagement of one or more of the attachment components of the electric scooter, or when the electric scooter is coupled to another electric scooter via the one or more attachment components.

Further, in some cases, a group of electric scooters can work as a single entity when coupled together as described herein. When connected physically or wirelessly over a network or local communication channels, the scooters can act to perform scooter functions (e.g., braking, accelerating, decelerating) when the first or a lead scooter performs the function. For example, when a leader scooter brakes, all other connected scooters brake. For example, a scooter can remain actively neutral. When a first or leader scooter accelerates, the following scooters can accelerate at the same rate of acceleration. The scooters can be actively biased in either direction of the grouping, depending on the needs of the other scooters in the grouping.

Thus, as described herein, an electric scooter can include components that facilitate the combining of scooters into various configurations or groupings, in order to facilitate efficient and easy collection of scooters, among other benefits. Various systems can assist in transporting grouped scooters, such as scooter management systems, and systems that modify operation modes of scooters when being collected, allowing for safe transport and collection, among other benefits.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order; and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

We claim:

1. An electric scooter, comprising:
    a chassis that includes an electric battery, a controller, and one or more external charging ports;
    a deck disposed on top of the chassis;
    a steering tube attached to a front wheel fork through the chassis;
    handlebars supported by the steering tube;
    a front wheel attached to the front wheel fork;
    a back wheel attached to a rear of the chassis;
    a hub motor fixed to the back wheel or front wheel and controlled by the controller; and
    one or more attachment components that facilitate attachment of the electric scooter to another electric scooter, including:
        a vertical link bar having a wishbone shape that attaches to the steering tube of the electric scooter such that it can be moved into multiple positions, including:
            a collection position, in which the vertical link bar extends in a horizontal direction away from the steering tube; and
            a ride position, in which the vertical link bar extends in a vertical direction parallel to a long axis of the steering tube.

2. The electric scooter of claim 1, wherein the one or more attachment components include:
    a lateral attachment component configured to laterally attach the chassis of the electric scooter to a chassis of another electric scooter.

3. The electric scooter of claim 1, wherein the one or more attachment components include:
    a vertical reception component configured to facilitate attachment of another electric scooter to a rear portion of the electric scooter.

4. The electric scooter of claim 1, wherein the one or more attachment components include:
    a rear link component that is fixed to a rear portion of the chassis and configured to receive a vertical link bar of another electric scooter.

5. The electric scooter of claim 1, wherein the one or more attachment components include:
    a connecting rod that extends from an internal area of the chassis and is configured to laterally attach the chassis of the electric scooter to a chassis of another electric scooter.

6. The electric scooter of claim 1, wherein the one or more attachment components include:
    an external span bar that attaches to one of the one or more external charging ports of the electric scooter and an external charging port of another electric scooter to laterally attach the chassis of the electric scooter to a chassis of the another electric scooter.

7. The electric scooter of claim 1, wherein the one or more attachment components include:
    a swivel bar that is coupled to the deck of the chassis and rotates from the deck of the chassis to laterally attach the chassis of the electric scooter to a chassis of another electric scooter.

8. The electric scooter of claim 1, wherein the controller of the electric scooter is configured to cause the hub motor to operate in a collection mode of operation upon engagement of one or more of the attachment components of the electric scooter.

9. The electric scooter of claim 1, wherein the controller of the electric scooter is configured to cause the hub motor to operate in a collection mode of operation when the electric scooter is physically coupled to another electric scooter via the one or more attachment components.

10. A method of collecting multiple electric scooters from a geographic location, the method comprising:
    attaching a first electric scooter to a second electric scooter by vertically attaching a front portion of the second electric scooter to a rear portion of the first electric scooter; and
    attaching a third electric scooter to the second electric scooter by laterally attaching a chassis of the third electric scooter to a chassis of the second electric scooter,
        wherein laterally attaching the chassis of the third electric scooter to the chassis of the second electric scooter includes laterally attaching the chassis of the third electric scooter to the chassis of the second electric scooter via a swivel bar that couples the chassis of the third electric scooter to the chassis of the second electric scooter.

11. The method of claim 10, further comprising:
    attaching a fourth electric scooter to the third electric scooter by vertically attaching a front portion of the fourth electric scooter to a rear portion of the third electric scooter.

12. The method of claim 10, further comprising:
    causing the first electric scooter, the second electric scooter, and the third electric scooter to operate in a collection mode of operation when attached to the other electric scooters.

13. The method of claim 10, further comprising:
causing the first electric scooter to operate in a leader collection mode of operation when attached to the other electric scooters; and,
causing the second electric scooter and the third electric scooter to operate in a follower collection mode of operation when attached to the other electric scooters.

14. The method of claim 10, wherein vertically attaching the front portion of the second electric scooter to the rear portion of the first electric scooter includes attaching a wishbone-shaped link bar movably coupled to a steering tube of the second electric scooter to a rear link component fixed to a rear portion of the first electric scooter.

15. An electric scooter, comprising:
a chassis that includes an electric battery and a controller;
a deck disposed on top of the chassis;
a steering tube attached to a front wheel fork through the chassis;
handlebars supported by the steering tube;
a front wheel attached to the front wheel fork;
a back wheel attached to a rear of the chassis;
a hub motor coupled to the back wheel or front wheel and controlled by the controller; and
a swivel bar that is coupled to the deck of the chassis and configured to laterally attach the chassis of the electric scooter to a chassis of another electric scooter.

16. The electric scooter of claim 15, further comprising:
a vertical attachment component configured to vertically attach a front portion of the electric scooter to a rear portion of another electric scooter; and
a vertical reception component configured to facilitate attachment of another electric scooter to a rear portion of the electric scooter.

17. The electric scooter of claim 15, wherein the controller of the electric scooter is configured to cause the hub motor to operate in a collection mode of operation upon engagement of the swivel bar.

18. The electric scooter of claim 15, wherein the controller of the electric scooter is configured to cause the hub motor to operate in a collection mode of operation when the electric scooter is physically coupled to another electric scooter via the swivel bar.

19. The electric scooter of claim 15, further comprising:
one or more charging ports disposed on the chassis of the electric scooter.

* * * * *